Figure 3:
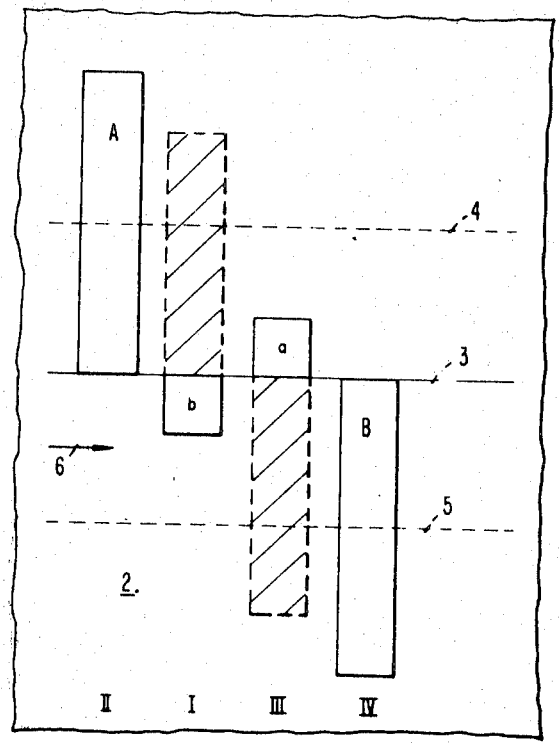

United States Patent [19]

Matla et al.

[11] 4,396,960

[45] Aug. 2, 1983

[54] SERVO TRACK FOLLOWING CONTROL FOR MAGNETIC HEADS, AND METHOD FOR COMPENSATING UNIFORM DISTURBANCE VARIABLES

[75] Inventors: Arno Matla, Waldenbuch; Volker Zimmermann, Sindelfingen, both of Fed. Rep. of Germany

[73] Assignee: International Business Machines Corporation, Armonk, N.Y.

[21] Appl. No.: 242,965

[22] Filed: Mar. 12, 1981

[30] Foreign Application Priority Data

Mar. 13, 1980 [DE] Fed. Rep. of Germany ....... 3009548

[51] Int. Cl.$^3$ .............................................. G11B 21/10
[52] U.S. Cl. ...................................................... 360/77
[58] Field of Search .................................... 360/77–78, 360/75, 70, 109, 27; 318/576, 611, 653, 560

[56] References Cited

U.S. PATENT DOCUMENTS

| | | | |
|---|---|---|---|
| 3,185,972 | 5/1965 | Sippel | 340/174.1 |
| 3,534,344 | 10/1970 | Santana | 340/174.1 |
| 3,593,331 | 7/1971 | Connell et al. | 360/77 |
| 3,725,764 | 4/1973 | Oswald | 318/629 |
| 3,864,740 | 2/1975 | Sordello et al. | 360/77 |
| 3,881,184 | 4/1975 | Koepcke et al. | 360/78 |
| 4,071,856 | 1/1978 | Kihara et al. | 360/77 |
| 4,321,621 | 3/1982 | Kingo et al. | 360/77 |

OTHER PUBLICATIONS

IBM Tech. Disc. Bull., V. R. Witt, Write Modulation of Data Track Edges for Track Following, vol. 20, No. 7, Dec. 1977, pp. 2821-2822.

*Primary Examiner*—Alfred H. Eddleman
*Attorney, Agent, or Firm*—Walter J. Madden, Jr.

[57] ABSTRACT

For the servo track control of magnetic heads over magnetic tracks, in addition to the main servo position signals arranged in offset fashion to the middle of the track, auxiliary servo position signals are provided symmetrically on each side of the middle of the track. These auxiliary servo position signals are offset along the track length relative to each other and are smaller than half the track width. In the determination of the position error signal, they serve to indicate the tilting of the magnetic head relative to the recording track in that they are unequal. If the magnetic head deviates greatly from the middle of the track, these auxiliary servo position signals can be added to the main servo position signals to obtain a stronger position error signal. For determining and compensating uniform disturbance variables, the momentary values of a control signal are measured and a mean value is formed thereof which, at predetermined intervals, is added to a preceding mean value, stored, and entered as an additional control signal to the control path.

3 Claims, 5 Drawing Figures

U.S. Patent  Aug. 2, 1983  Sheet 1 of 2  4,396,960
FIG. 1
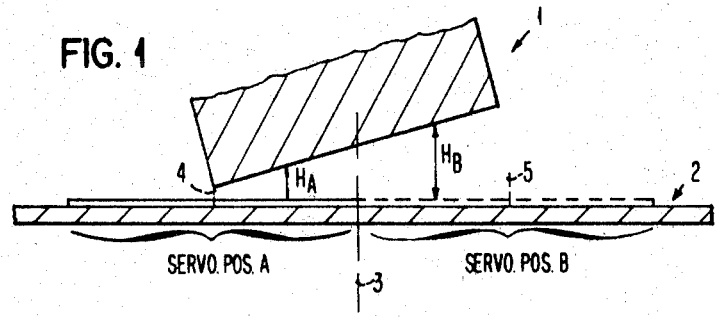
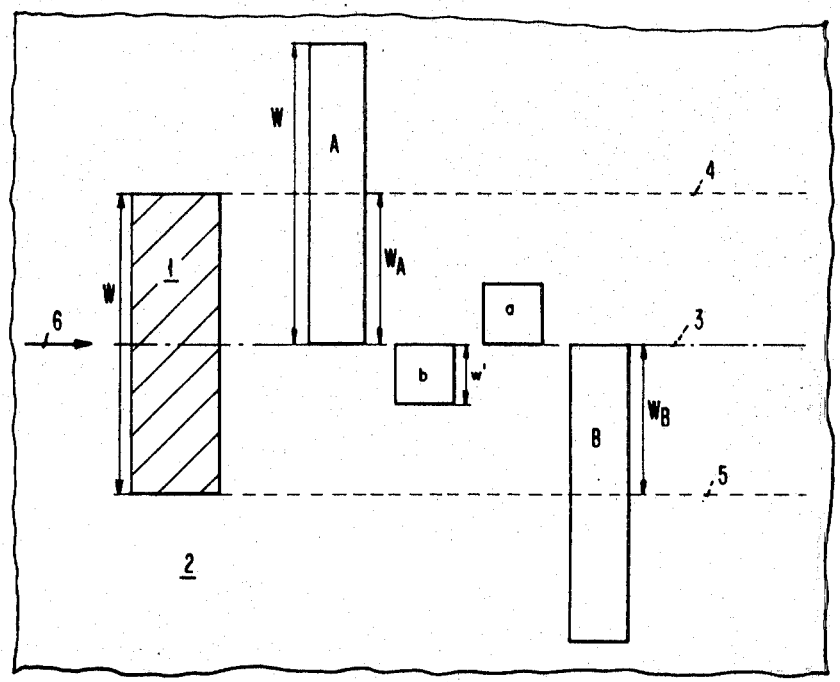
FIG. 2
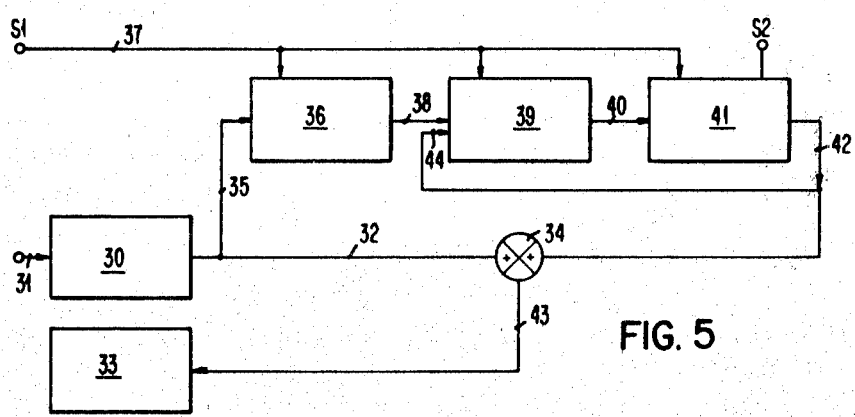
FIG. 5

SERVO TRACK FOLLOWING CONTROL FOR MAGNETIC HEADS, AND METHOD FOR COMPENSATING UNIFORM DISTURBANCE VARIABLES

TECHNICAL AREA

The invention relates to a device for the servo track following control of magnetic heads, and to a method for compensating uniform disturbance variables, particularly in such servo track following controls.

BACKGROUND ART

In magnetic record carriers which execute a movement relative to the magnetic heads, as in disk storages, devices are known for the servo track following for the purpose of controlling and maintaining the track position of magnetic heads. Servo position signals are recorded in offset fashion on a magnetic record carrier on both sides of the middle of recording tracks, said signals being wider than the track. These servo position signals are pre-coded information signals which can be located in so-called servo sectors, i.e. individual sectors in a circumferential data track which serve for servo purposes only, and which can be alternatingly interrupted by longer data sectors within one track. However, the servo position signals can also be recorded on separate servo tracks, or on a separate side of a disk of a disk pack.

The servo position signals on both sides of the tracks are read and detected by the magnetic heads. A position error signal supplying data on the deviation of the magnetic head from the track center is detected by forming the difference of the two servo position signals to the right and left of the middle of the track. If this difference is zero, it is assumed that the head is precisely over the track. A device for servo track following control as described above is shown in U.S. Pat. No. 3,185,972, issued May 25, 1965.

The signal induced in the magnetic head is exponentially inversely proportional to the distance between the magnetic surface of the record carrier and the head gap. If there is a difference of head gap distance relative to the record carrier, the servo position signals induce signals of different intensity in the magnetic head, even when the magnetic head is positioned precisely over the middle of the track. Owing to this tilting, which appears particularly in disk storages with flexible disks, because the structure of the substrate, the roughness of the surface, the form and suspension of the magnetic head, do not always ensure that the head flies over the entire track width in parallel to the disk surface, a position error signal is generated which wrongly differs from zero and thus causes a setting of the magnetic head by the following control circuit and the access mechanism. Consequently, the head is shifted although it had been neither necessary nor justified. A tilting of the magnetic head thus simulates a radial positional deviation, with the consequence that the control circuit reacts with a deviation from the middle of the track.

It is therefore an object of the present invention to design a device in such a manner that even deviations from the uniform height between magnetic head and track, or servo signals respectively, do not cause a wrong reaction, or in other words, that magnetic head tiltings or oblique record carriers are detected and corrected in such a manner that the head follows the track as required.

The providing of the servo position signal encoding in accordance with the invention, and the kind of evaluation of the auxiliary servo position signals advantageously used for normalizing the position error signal actuating the control, for synchronizing and for improving the signal-to-noise ratio, e.g. in the switching in addition to the standard or main servo position signals.

Another problem appearing in connection with servo track follower circuits are the so-called uniform errors or disturbance variables. Under ideal conditions, these control circuits keep the middle of the magnetic head precisely over the middle of the track. In reality, however, the middle of the head does not move exactly on the middle of the track. One of the reasons is the noise, and consequently a lack of precision, during the determination of the position. Another important reason for errors is the disturbance variables acting on the circuit following the control. Examples for such disturbance variables are aerodynamic forces acting on the magnetic head and displacing it to the track side, as well as offset voltages in amplifiers. Without specific countermeasures in the control circuit, such phenomena cause stationary consequential errors, or uniform errors, respectively.

It is generally known, as shown by an example in U.S. Pat. No. 3,534,344, issued Oct. 13, 1970, to eliminate such uniform disturbance variables by means of controls of an integral contribution. However, the integral contribution considerably restricts the dynamics of the control circuit, and transient processes are prolonged. For these reasons, such controls are quite unsuitable for servo track controls of magnetic heads which have to react very quickly.

In control systems of servo track following controls it is known, as shown for example in U.S. Pat. No. 3,725,764, issued Apr. 3, 1973, that the control system shows delayed action which is to be compensated. For this compensation, it describes a method of generating an additional signal that is proportional to the deviation velocity, and adding it to the deviation signal compensated in phase position and amplitude. This sum signal is applied via another compensator to the control element as a control signal. For the compensation of uniform disturbance variables, such a control is not suitable as it does not respond, or only incorrectly, to this type of disturbance variable.

A method known from U.S. Pat. No. 3,881,184, issued Apr. 29, 1975, compensates periodically recurrent errors within servo track following controls in that the periodically recurrent errors are first detected, then stored and subsequently added to the position error signal in a manner according to their position. This method for eliminating periodic errors does not give any indication with respect to solving the problem of uniform disturbance variables and their elimination.

With respect to this above mentioned problem of uniform errors or disturbance variables, an object of the present invention furthermore consists in compensating these disturbance variables in control circuits as in particular in servo track following controls simply, reliably, and without further influencing the characteristic of the control circuit.

Connected with this solution is the important advantage that uniform disturbance variables are simply compensated in control circuits without the control circuit dynamics being affected, and that consequently, if used in servo track following controls for magnetic heads, the latter are kept in the middle of the track.

DRAWINGS

Figure 4:
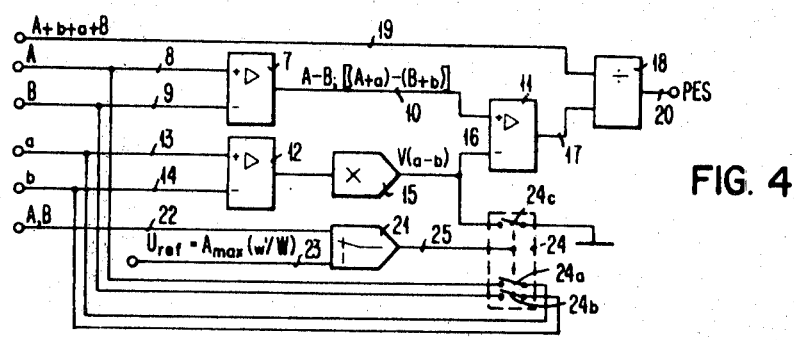

The invention and its various aspects are discussed in detail below with reference to embodiments shown in the drawings. The figures show the following:

FIG. 1 schematically shows a tilted magnetic head arranged over a part of a magnetic disk;

FIG. 2 schematically shows the servo track position signals in accordance with the present invention in a plan view of a track sector of a magnetic disk;

FIG. 3 schematically shows the type of application of the encoding in accordance with the invention, i.e. its initializing;

FIG. 4 is a block diagram of a circuit to evaluate the encoding, and to determine the position error signal in accordance with the present invention, and FIG. 5 schematically shows a block diagram of a control circuit for the servo track following, the control permitting the correction of uniform disturbance variables.

BEST MODE EMBODIMENT AND INDUSTRIAL APPLICABILITY

FIG. 1 shows a magnetic head 1 in its position over a magnetic disk 2. Magnetic head 1 is tilted with respect to the surface of the magnetic disk so that the one side of the head is closer to the disk than the other. This is indicated by arrows $H_A$ and $H_B$ of different length. $H_A$ represents the field intensity of the stray flux emanating from servo position signal A at the left of the track center marked 3. $H_B$ represents the field intensity of the stray flux emanating from servo position signal B on the right side of track center 3. The actual data recording track is between the borderlines 4 and 5. This is shown more clearly by FIG. 2. The representation in FIG. 1 demonstrates the problem to be solved by the present invention, i.e. that with a tilted magnetic head and its precise position over the track center 3, as represented in the figure, a differing field intensity is induced in the head by means of servo position signals A and B. This simulates a non-existing shifting off the middle of the track. Owing to the control circuit, this has generally had the effect that the head is shifted off track center 3 in accordance with the position error signal obtained from the difference of servo position signals A and B.

In a plan view of part of a magnetic disk 2, FIG. 2 schematically shows the encoding in accordance with the invention for detecting and eliminating the magnetic head tilting depicted in FIG. 1. Magnetic head 1 is over track center 3 and precisely between borderlines 4 and 5. It moves relative to the magnetic disk 2 in flight direction 6, represented by the corresponding arrow. Seen in flight direction 6, on the left of data track center 3, servo position signal A is encoded in a width W corresponding for example to the track width. Encoding A starts precisely on the left-hand limit of track center 3. Spaced slightly from servo position signal A of flight direction 6, the second servo position signal B is recorded on the right side of track center 3, also preferably in a width W that corresponds to the track width. Between these two main servo position signals A and B, auxiliary position signals a and b are offset in accordance with the invention, on the right and left of track center 3. These auxiliary position signals a and b are of a smaller width w' than main servo position signals A and B, said width w' corresponding in its maximum approximately to the width $W_A$ or $W_B$, covered by the magnetic head when moving over track center 3, from the main servo position signals A and B.

The designation A, B and a, b refer to electrical values with amplitude and polarity of the servo position signals. The designations W, w', $W_A$ and $W_B$ are the physical widths of the signal-associated magnetizations on the track of magnetic disk 2 or the parts thereof that are moved over by magnetic head 1. The additional auxiliary servo position signals a and b are arranged symmetrically with respect to track center 3, and according to the example given, in such a manner between the two main servo position signals A and B, that subsequent to the main servo position signal A, in flight direction 6, there is auxiliary servo position signal b on the other side of track center 3, and subsequently at a certain distance, the other auxiliary servo position signal a is arranged on the other side of track center 3. Then, there appears again on the other side of track center 3, the second main servo position signal B. The effect of the two additional auxiliary servo position signals a and b is that when the magnetic head moves over the center of the track in a non-tilted state, both their signal parts are quite equal. However, if magnetic head 1, as shown in FIG. 1, is tilted relative to magnetic disk 2, the difference between a and b contributes to the control signal utilized in a compensating manner.

The encoding of FIG. 2, considering at first only the two main servo position signals A and B, which are also called burst signals, is an encoding in accordance with the so-called "diburst pattern." The position error signal is obtained from the difference between the two burst signals A−B. In a normalized form, the following equation is used for the position error signal:

$$PES = \frac{A - B}{A + B}$$

This is the usual position error signal PES used for setting the magnetic head to the center of the track.

By means of the additional auxiliary servo position signals a and b, i.e. additional bursts which are narrower than half the track width W, the distance changes between magnetic disk 2 and magnetic head 1 in the area $W_A > w'$, or $W_B > w'$ are found by determining whether $A \neq B$. If the exponential distance law which governs the head-induced signal is linearized in small areas, the following formula for the correct position error signal applies in those areas where $W_A$ and $W_B > w'$:

$$PES = \frac{(A - B) - v(a - b)}{A + B + a + b}$$

v being the ratio of the width of the main servo position signal to auxiliary servo position signal, i.e. v=W/w'.

FIG. 3 schematically shows a way of initiating the encoding pattern on magnetic disk 2. First, in a step marked I, the auxiliary servo position signal b, with the write head accordingly shifted off track center 3, is encoded over its entire width W at the position that is correct with respect to time and place. Subsequently, in the second step marked II, the first main servo position signal A, with correspondingly shifted-off write head, is encoded over its full width, writing taking place simultaneously, not only at the position for signal A, but also at the position for signal b. Then, the non-required shaded part of the auxiliary servo position signal b is overwritten and erased so that only on the one side of track center 3, there remains the desired part of the auxiliary servo position signal b.

In the following, i.e. the third step which is marked with III in FIG. 3, the second auxiliary servo position signal a is encoded over its entire width on magnetic disk 2. Subsequently, in the fourth step marked IV the second main servo position signal B is encoded in that the write head is now fully arranged on the right-hand side of track center 3, and encodes the main servo position signal B over its full width, as well as erases or overwrites at the same time, the shaded part of auxiliary servo position signal a encoded in step III. After step IV, there consequently remains the desired auxiliary servo position signal a on the one side of track center 3, i.e. on the other side of servo position signal B.

The circuit block shown in the diagram of FIG. 4, is used to detect the position error signal PES in accordance with the invention. A differential amplifier 7 receives on a line 8, the one main servo position signal A at the positive input. On another line 9, the negative input of this differential amplifier 7 receives the second main servo position signal B. At the output of differential amplifier 7, there consequently appears the difference A−B on line 10, and is applied to the positive input of another differential amplifier 11.

The additional auxiliary servo position signals a and b are applied to a differential amplifier 12 for generating the difference, and for evaluation. The positive input of differential amplifier 12 receives the auxiliary servo position signal a on a line 13, and the negative input receives the other auxiliary servo position signal b on line 14. The output signal of differential amplifier 12 is multiplied in a multiplying unit 15 with the factor v described above, which represents the quotient of the width W of the main servo position signal, and the width w' of the auxiliary servo position signal. Thus, there appears at the output of multiplying circuit 15, or at the minus input of differential amplifier 11 on line 16, the signal v(a−b). There is consequently at the output of differential amplifier 11 on line 17, the signal (A−b)−v(a−b). This signal on line 17 is applied to a divider circuit 18. This circuit 18 shows a second input with line 19 on which the sum of all servo position signals, i.e. A+b+a+B is applied. For generating position error signal PES at the output of line 20, divider circuit 18 now divides the signal on line 17 by the signal on line 19. The position error signal formed in accordance with the invention, is thus basically generated, and the differences of height between magnetic head and surface are detectable and considered in the position error signal in such a manner that there are no further displacements caused by tiltings.

If the magnetic head deviates from track center 3 in FIGS. 1 and 2, to such an extent than it leaves the area of the two auxiliary servo position signals a or b, these signals are still contained in the final result of position error signal PES, but they diminish this signal which in the large track deviation should be fully available for returning the magnetic head to the middle of the track. In view of this fact, and in view of the possible contributions of auxiliary servo position signals a and b, the circuit diagram of the embodiment of FIG. 4, shows a comparator circuit 21. This comparator circuit 21 receives signals A or B on an input line 22, and a reference voltage is applied on a line 23, this voltage representing the width relationship between auxiliary and main servo position signal, i.e. w'/W, and the maximum amplitude of signal A or B. So, if no signal a or b is detected any longer by magnetic head 1, comparator circuit 21 responds and controls a switch 24 in such a manner that the output signal of multiplying circuit 15 is connected to ground on line 16 via contact 24c, and is consequently no longer active at the negative input of differential amplifier 11.

Simultaneously with eliminating the signal on line 16 for differential amplifier 11, output 25 of comparator circuit 21, by closing two contacts 24a and 24b, adds auxiliary servo position signal a on line 13 to line 8 of main servo position signal A at the positive input of differential amplifier 7. Furthermore, via contact 24b of controllable switch 24, the second auxiliary servo position signal b on line 14 is added to line 9 and thus to the negative input of differential amplifier 7 so as to additionally amplify the main servo position signal B. This further adding of the auxiliary servo position signals to the main servo position signals, in a case of large track deviations and small signal amplitudes of A and B, permits an improved signal-to-noise ratio by significantly increasing the signal amplitudes.

The basic circuit of the block diagram of FIG. 4, and the encoding according to the invention, as represented in FIG. 2, advantageously permit the detection and correction of errors in the position error signal resulting from changed distances between head and disk surface. This is achieved with relatively low additional effort in the initializing of the encoding pattern. It is furthermore possible to use the additional auxiliary servo position signals a and b for normalizing on the one hand, as described above, and to contribute to improving the signal-to-noise ratio, as equally described by the addition to the main servo position signals.

FIG. 5 shows, in a schematic block circuit diagram, a control unit for the servo track following which is provided in accordance with the invention for correcting uniform disturbance variables. The input signal to be controlled is applied to a control unit 30 on an input line 31. On output line 32 there is the control signal which, without considering the disturbance elimination according to the invention, is applied directly to a control mechanism 33 via a summing point 34.

In track following controls, control unit 30 is generally a digital or sampling control. It forms a sum, weighted with coefficients, of the present input value at a predetermined moment, and past input and output values. The greater the amount of past input and output values used, the higher the gradation of the control unit. The control mechanism at 33 comprises the output amplifier for the motor, as well as the access mechanism adjusting the head, or its carrier arm in track following control.

For correcting the uniform disturbance variables, the output signals of control unit 30 on line 35 are applied to a mean value generator 36. This mean value generator 36 collects all control unit values appearing over a predetermined period, e.g. one revolution of a track, and forms a mean value thereof depending on the number of values. By means of a control signal S1 on line 37, this mean value is applied to an adder 39 via output line 38. At the same time, owing to signal S1 on line 37, adder 39 applies the value to be stored via its output line 40 to a storage 41. Clocking in storage 41 for this purpose is equally effected via control signal S1 on line 37.

The value now stored in storage 41 is applied via output line 42 to summing point 34 and thus additionally supplements the control signal on line 32 so that a higher signal is applied via line 43 to control mechanism 33. At the same time, the output signal on line 42 is applied to an input 44 of adder 39 so that the storage value in storage 41, together with the value on line 38 is newly written in upon a renewed appearance of control signal S1. The additional variable on line 42, which in accordance with the clocking of signal S2, is applied as an additional setting variable so summing point 34 drives the magnetic head toward the middle of the track when the control serves this purpose. If several servo and data sectors are provided in one track, the clocking of signal S2 corresponds to the appearance of the servo sectors so that the output value of storage 41 on line 42 is applied to summing point 34 following the servo sector clocking. There it joins the output signal on line 32 of control unit 30 which appears equally in that clocking.

The past value of storage 41 on line 44 is added in adder 39 to the present mean value supplied on line 38 by mean value generator 36. Thus, an actualized value is added in adder 39 via line 40 to storage 41. Up to its change in the clocking of signal S2, this value is respectively available on output line 42 as an additional setting variable.

If it is assumed that the "uniform force" to be compensated changes neither in direction nor in intensity, the next mean value of the next signal S1 between two mean value generations in the clocking of signal S1 will be zero. On line 38, there consequently is zero value at the input of adder 39. Superimposed thereon is the old value in storage 41 over input 44 so that storage 41 is actualized with its old value. So the same setting variable remains in summing point 34, and the head is consequently shifted toward the middle of the track with a constant quantity superimposed on the output of control unit 30.

However, if there is a change of the mean value between two mean value generations in mean value generator 36 between two appearances of signal S1, i.e. between two revolutions, there is also a change of variable and direction of the value entered by adder 39 in storage 41 so that summing point 34 receives another variable on line 42 in the clocking of signal S2, i.e. for example of the servo intervals.

With the above described arrangement in accordance with the invention, the extent of uniform disturbance variable is advantageously concluded from the control signals themselves, and these variables are compensated on this basis in such a manner that the dynamics of the actual control circuits are not affected thereby.

We claim:

1. Servo track following control for controlling and maintaining the track position of magnetic heads executing a movement relative to a magnetic record carrier, the servo track containing main servo position signals (A, B) whose combined width is wider than the track width (W), said servo position signals being recorded in offset fashion on said magnetic record carrier on both sides of the middle of a recording track, the value of the servo position signals read by the magnetic head being detected by the control, and a position error signal being generated by checking whether the difference of the two servo position signals (A, B) equals zero, characterized in that auxiliary servo position signals (a, b) are provided in addition to the main servo position signals (A, B), one on each side symmetrically to the middle of the track and offset with respect to each other in the track direction, said auxiliary servo position signals (a, b) being of a width (w') less than half the track width (W), means for forming the difference (a−b) of the two auxiliary servo position signals (a, b), means for generating the position error signal with the auxiliary servo position signals (a, b) being included, said position error signal being determined in accordance with the equation $$PES = \frac{(A - B) - \frac{W}{w'}(a - b)}{A + B + a + b}.$$

2. Servo track following control as claimed in claim 1, including a comparator circuit, a controlled switching device connected to the output of said comparator circuit, whereby the contribution of the auxiliary servo position signals is eliminated in the forming of the difference between the contribution of the servo position signals (A−B) and that of the auxiliary servo position signals (W/w' (a−b)), and the signal contributions of the auxiliary servo position signals (a, b) are added (A+a; B+b) to the respective main servo position signals (A, B) prior to the forming of the difference of the main servo position signals.

3. A method of encoding main and auxiliary servo position signals (A, B, a, b) for a track following servo, the track to be followed having a predetermined width W, comprising the steps of:

I. encoding the first auxiliary servo position signal (b) with a write head shifted by an amount less than one full track width to one side of the middle of said track over the full head width (W), II. encoding the first main servo position signal (A) with a write head shifted by a full track width to said one side of the middle of said track over its full width (W), and simultaneously erasing a portion of said auxiliary signal so that said auxiliary servo position signal is reduced to a smaller width (w'), III. encoding the second auxiliary servo position signal (a) with a write head shifted by an amount less than one full track width to the other side of the middle of said track over its full head width, and IV. encoding the second main servo position signal (B) with a write head shifted by a full track width to said other side of the middle of said track over its full head width, and simultaneously erasing a portion of said second auxiliary servo signal so that said auxiliary servo position signal (a) is reduced to said smaller width (w').

* * * * *